(12) United States Patent  
Knepper

(10) Patent No.: US 7,375,957 B2  
(45) Date of Patent: May 20, 2008

(54) SYSTEM FOR FACILITATING TRANSPORT OF A DESKTOP/TOWER COMPUTER CASE AND DISPLAY MONITOR

(75) Inventor: Paul A. Knepper, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 11/541,405

(22) Filed: Sep. 29, 2006

(65) Prior Publication Data

US 2008/0080127 A1    Apr. 3, 2008

(51) Int. Cl.  
*G06F 1/16*    (2006.01)

(52) U.S. Cl. .................. 361/683; 361/681; 312/223.12; 312/223.2

(58) Field of Classification Search ................. 361/683; 312/223.1, 223.2; 248/917–923; 206/320, 206/526

See application file for complete search history.

(56) References Cited

U.S. PATENT DOCUMENTS 5,229,757 A * 7/1993 Takamiya et al. ........... 345/168  
5,664,673 A * 9/1997 Perry .......................... 206/371  
5,845,978 A * 12/1998 Jung ........................... 312/244  
6,442,018 B1   8/2002 Dinkin  
7,002,793 B2 * 2/2006 Imsand ....................... 361/683  
7,035,093 B2 * 4/2006 Imsand ....................... 361/683  
2003/0043109 A1   3/2003 Hong  
2005/0068718 A1 * 3/2005 Cheng et al. ............... 361/683  
2005/0105254 A1 * 5/2005 Lee et al. ................... 361/679  
2007/0070591 A1 * 3/2007 Sheng et al. ................ 361/683

OTHER PUBLICATIONS

XBAGS, Case Transport Strapping System (CTSS), web page, 2001-2004.  
Daniel Rutter, Xbags Case and Monitor Transport Strapping Systems, journal, Oct. 9, 2004. USA.

* cited by examiner

*Primary Examiner*—Lisa Lea-Edmonds  
*Assistant Examiner*—Anthony Q Edwards  
(74) *Attorney, Agent, or Firm*—Jeffrey A. Proehl; Woods Fuller Shultz & Smith PC

(57) ABSTRACT

A system for facilitating transport of a computer and monitor as a unit is disclosed, and comprises a computer case having an exterior, a support located on the computer case for supporting the monitor on the computer case, and a binder for removably binding the monitor to the computer case when the monitor is positioned on the support. The system may also include a handle located on the exterior of the computer case for being gripped by a hand of a user.

24 Claims, 4 Drawing Sheets

SYSTEM FOR FACILITATING TRANSPORT OF A DESKTOP/TOWER COMPUTER CASE AND DISPLAY MONITOR

BACKGROUND OF THE INVENTION

1. Field of the Invention

The present invention relates to combinations of computers and display monitors, and more particularly pertains to a new system for facilitating transport of a desktop/tower computer case and a display monitor in a relatively easy and convenient manner that protects the screen of the monitor.

2. Description of the Prior Art

The increasing availability and decreasing cost of monitors with a significantly reduced cabinet depth (typically referred to as "flat panel" monitors) has led to a corresponding increase in the popularity of such monitors. Flat panel monitors typically employ Liquid Crystal Diode (LCD) screens (although other technologies are also employed for the screen), and the LCD screens are relatively much thinner in cabinet depth than previous monitors based upon cathode-ray tube (CRT) screens. The thinner cabinet depth permits the use of the monitors in ways that were not generally possible with the heavier and bulkier CRT screens.

The relatively smaller size of the flat panel monitors has caused some users of computers, especially highly specialized computers, to desire to transport their computer and monitor between different sites for purposes such as computer gaming tournaments. Although the LCD screens permit the flat panel monitors to be relatively less heavy and bulky than their CRT-based counterparts, it is still difficult to consider the flat panel monitors as "portable", especially those flat panel monitors that employ relatively large base portions designed to sit on a desktop and support the screen portions of the monitors. Also, the combination of the computer case and the monitor is not easily toted as a unit since the computer case (typically a tower case) has a boxy and smooth exterior and the flat panel monitor has a more variegated and awkward shape. These factors, as well as the fragility of the LCD screen of the flat panel monitor, has discouraged the transport of the monitor with a tower or desktop computer case.

It is therefore believed that there exists a need in the art for a system that facilitates the transporting of a monitor with a desktop or tower computer case in a more convenient and secure manner than has heretofore been known.

SUMMARY OF THE INVENTION

The present invention provides a new system that facilitates the transport of a desktop/tower computer case and a display monitor in a relatively easy and convenient manner that protects the screen of the monitor.

In one aspect of the invention, a system for facilitating transport of a computer and monitor as a unit is disclosed, and comprises a computer case having an exterior, a handle located on the computer case for being gripped by a hand of a user, a support located on the exterior of the computer for supporting the monitor on the computer case, and a binder for removably binding the monitor to the computer case when the monitor is positioned on the support.

The foregoing is a general outline of some of the more significant aspects of the invention, and the detailed description of this application that follows discloses additional features of the invention which form the subject matter of the claims appended hereto.

One significant aspect of the present invention is that the monitor is held in a secure manner to the computer case that positions the display screen towards and in some cases against the broad face of the computer case to protect the screen against damage during transport.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
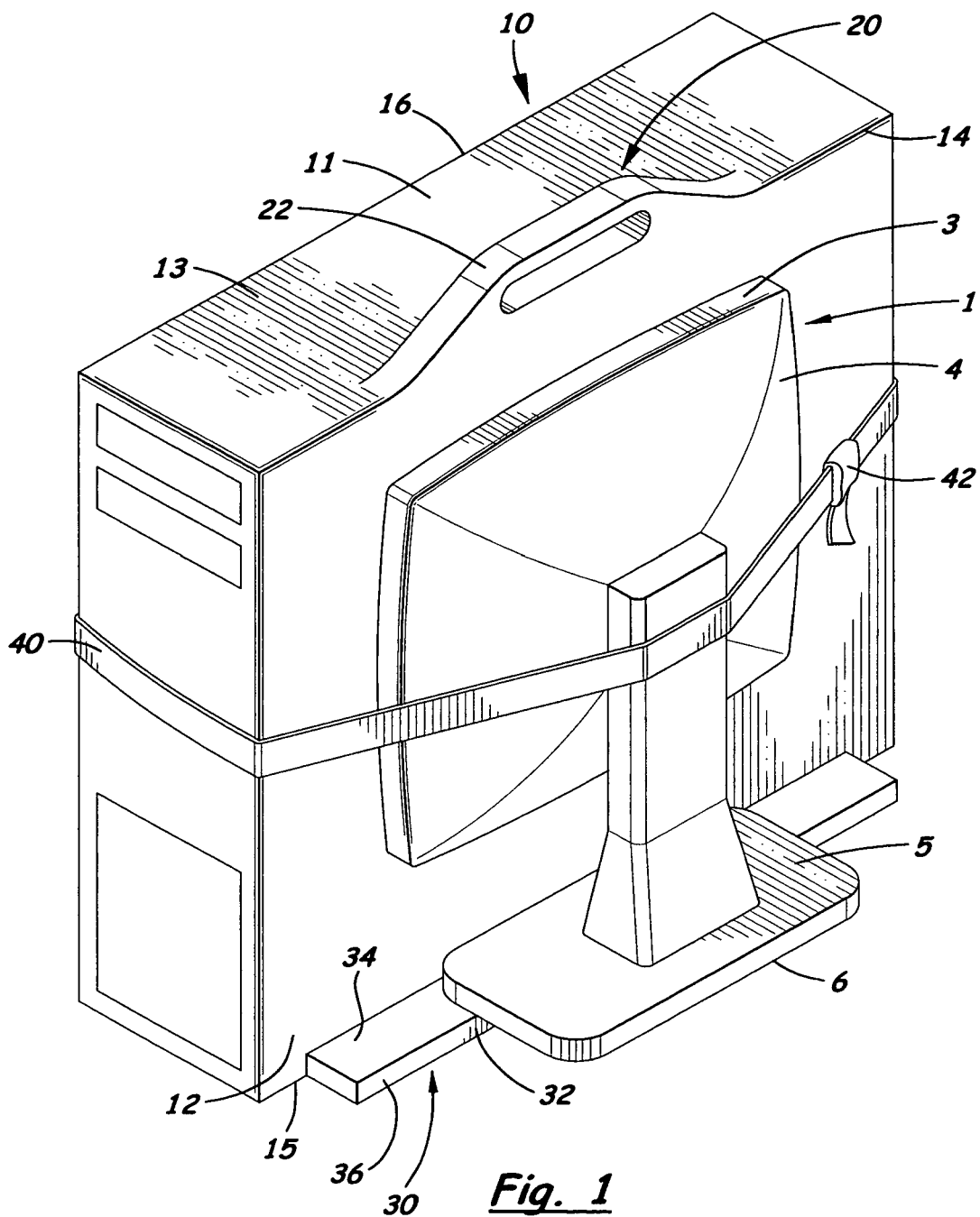
FIG. 1 is a schematic perspective view of monitor supported on a computer case with the present invention implemented thereon.
Figure 2:
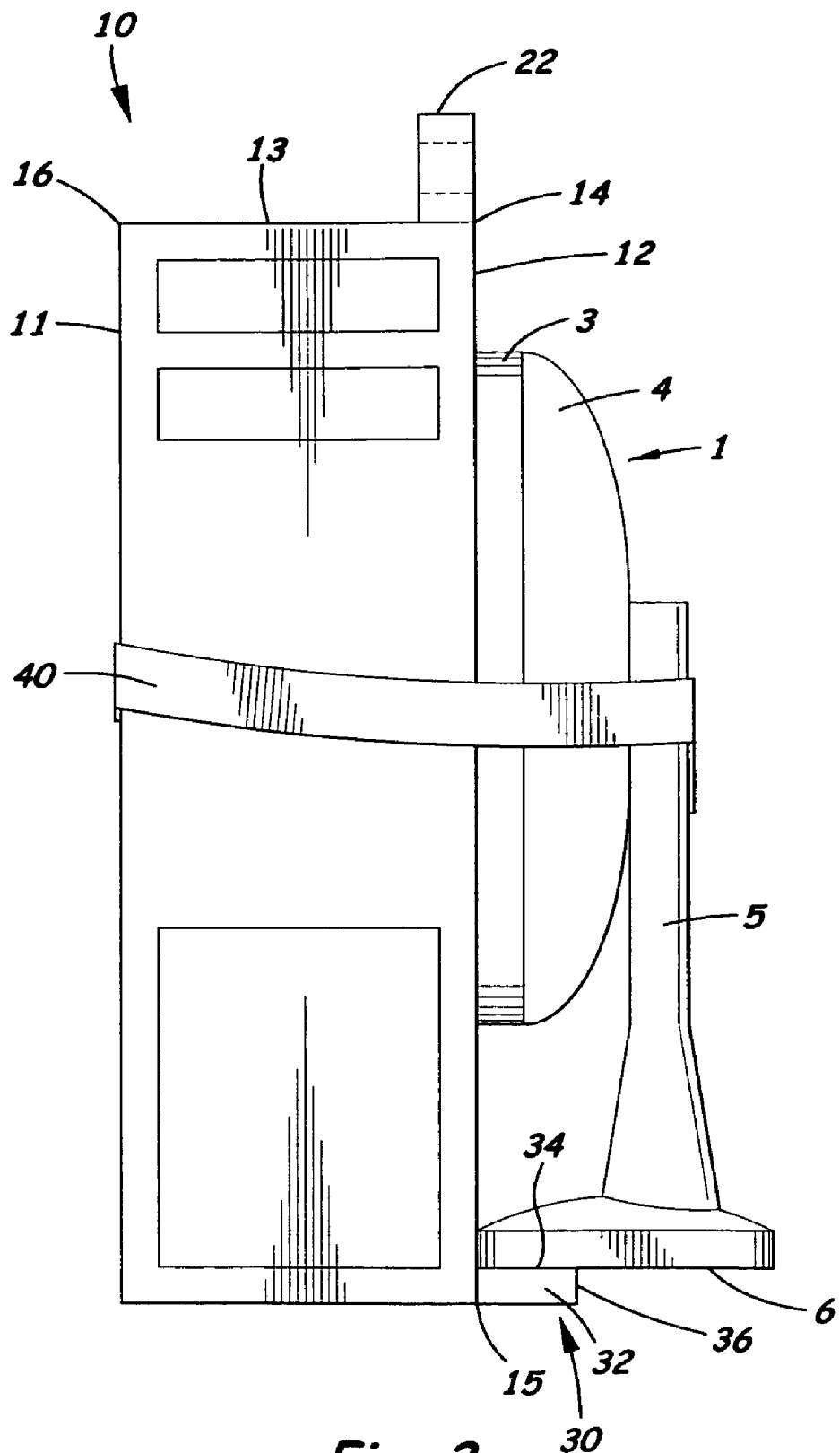
FIG. 2 is a schematic front elevation view of monitor supported on a computer case with the present invention implemented thereon.
Figure 3:
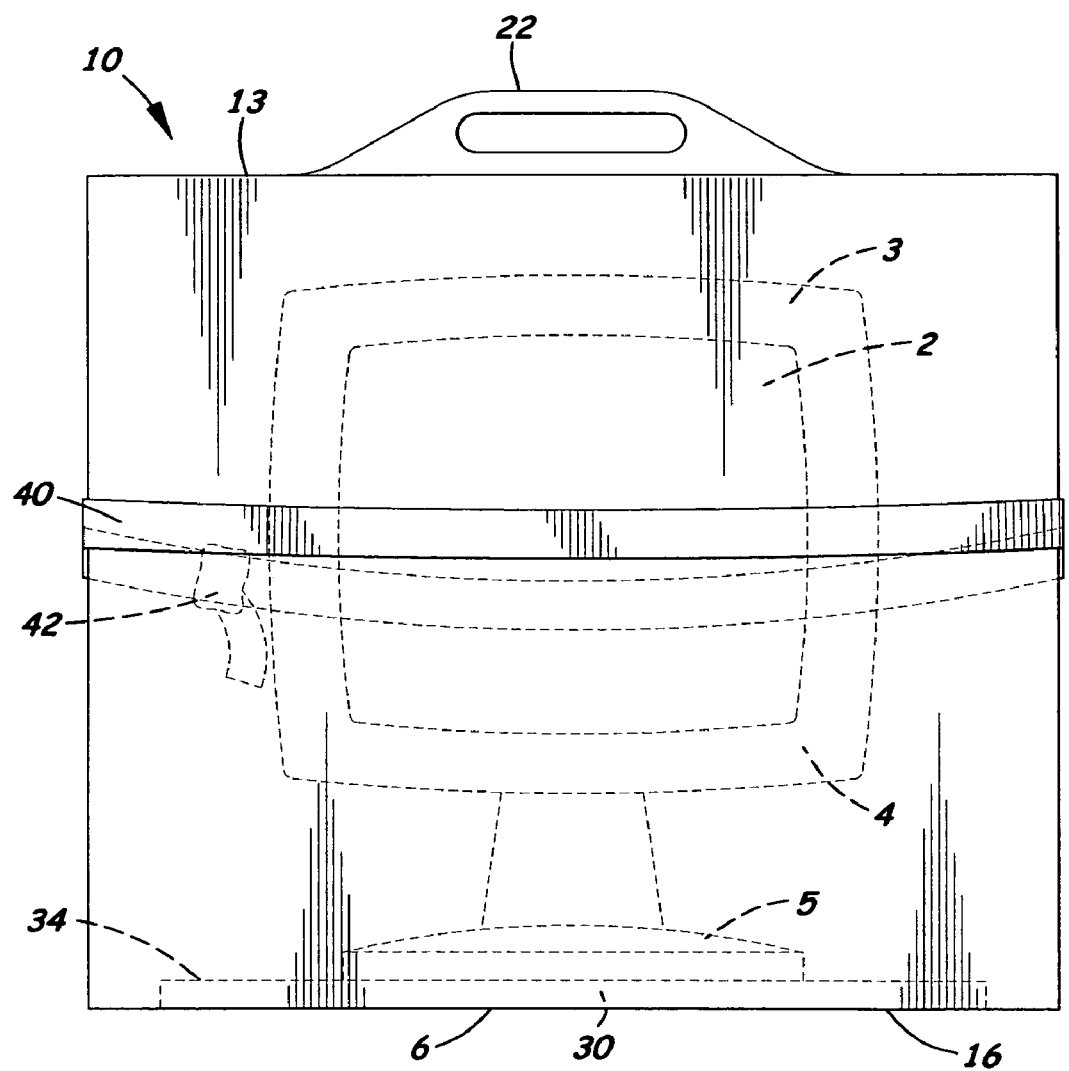
FIG. 3 is a schematic side elevation view of monitor supported on a computer case with the present invention implemented thereon.
Figure 4:
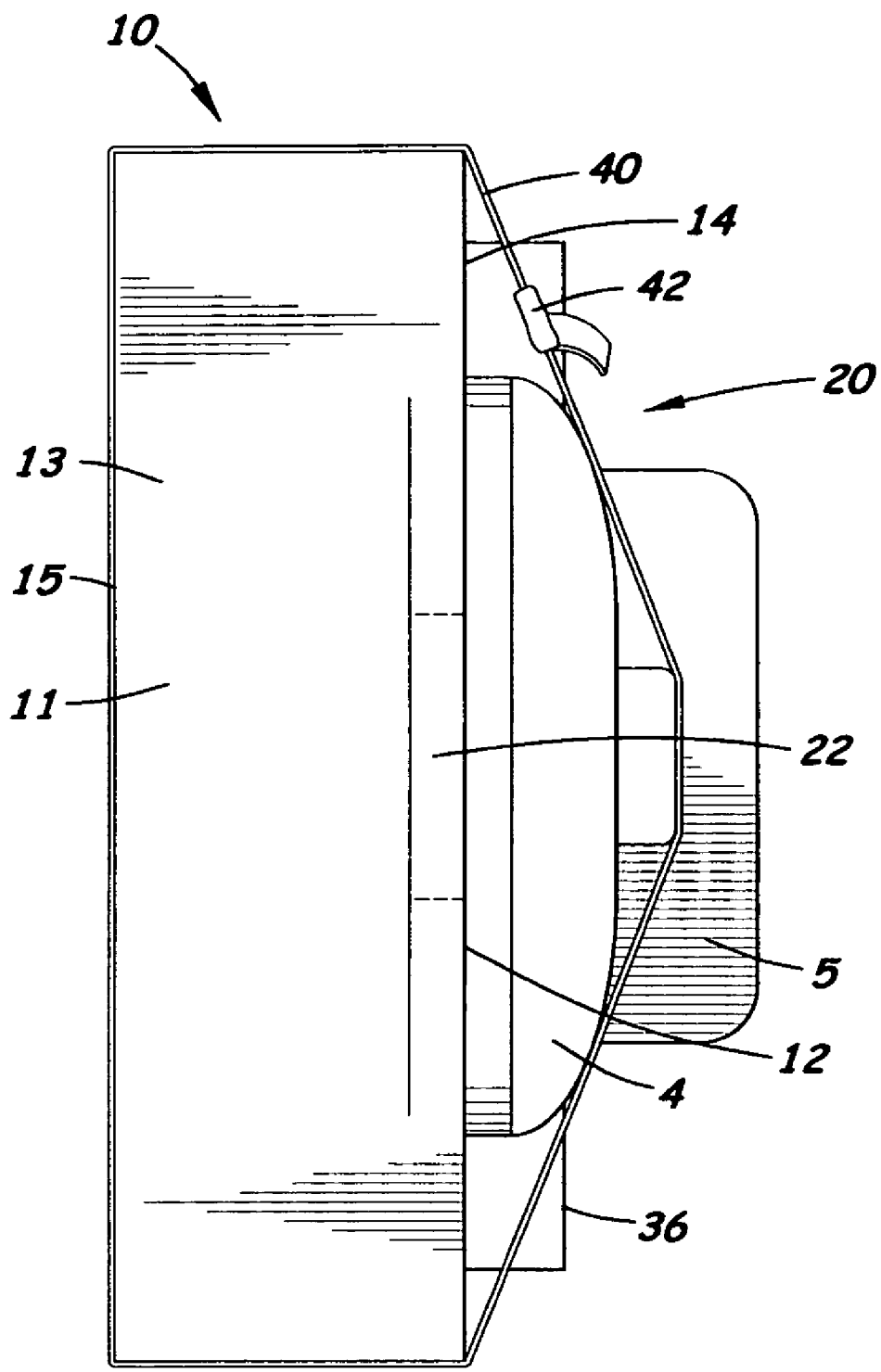
FIG. 4 is a schematic top plan view of monitor supported on a computer case with the present invention implemented thereon.

With reference now to the drawings, and in particular to FIGS. 1 through 4 thereof, the system for facilitating transport of a desktop/tower computer case and monitor of the present invention is generally designated by the reference numeral 20 in this description.

In general, the system 20 of the invention facilitates the temporary integration of a computer case and a monitor in a form that is relatively easy to transport, or tote, as a relatively compact unit, while permitting the separation and use of the case and monitor in a conventional manner after the transporting of these items is complete.

The system 20 is most suitably used with a monitor 1 of the type typically referred to as a "flat panel", and employs display screen technology that permits a substantially flat display screen surface 2 positioned in a bezel 3 that is also relatively flat, or at least includes a perimeter frame surface that lies in a single plane. The display screen 2 may be positioned in a relatively thin screen portion 4 that is mounted on a base portion 5. The screen portion 4 may or may not be pivotable with respect to the base portion 5, and may or may not be adjustable in height. The base portion 5 has a bottom 6 on which the monitor typically rests on a desk or other surface when in use.

The computer case 10 of the type which is suitable for use with the invention typically but not necessarily houses a central processing unit, memory devices, and storage devices. The computer case 10 may be designed for resting on a desktop surface in which the major extent of the case 10 extends in a horizontal plane in use, or may be designed for resting on one of the relatively thinner sides of the case with the major extent extending in a vertical plane. The computer case 10 has an exterior 11 that is typically is formed of a combination of metal and molded plastic panels that are mounted on the supporting internal chassis, although portions of the chassis may form portions of the exterior 11. The exterior 11 is often substantially cubical, with two relatively large major faces and four smaller rectangular faces extending between, and along the perimeters of, the major faces. The faces are generally (although not necessarily) flat, and are oriented at substantially perpendicular angles to each other. The faces of the case 10 typically meet at junctures that form edges, or elongate corners, that extend along the junctures.

For the purposes of describing the invention, the exterior 11 of the case 10 includes a first face 12 and a second face 13 that is oriented substantially perpendicular to the first face 12. The first face 12 comprises one of the major faces of the exterior 11 of the case, and the second face 13 forms one of the perimeter faces extending between the major faces. The first face 12 may comprise one of the side faces of a tower case, and the second face 13 may comprise a top or upper face of a tower case. The first 12 and second 13 faces converge together along a first juncture 14 or corner. For the purposes of this description, it is also helpful to recognize that the first face 12 has a first outboard edge 15 relative to and opposite of the first juncture 14, and the second face 13 has a second outboard edge 16 relative to and opposite of the first juncture 14.

The system 20 of the invention may include a handle 22 for gripping by a hand of the user during transport of the computer case. The handle 22 is located on the exterior 11 on the computer case 10, and may be integrally attached or optionally removably attached. The handle 22 may be being located toward the first juncture 14 of the computer case 10, and may be located on the second face 13 of the computer case. The handle 22 may be elongated along a first axis, and the first axis may be oriented substantially parallel to the first juncture 14. In some embodiments, the handle 22 may be positioned adjacent or closely adjacent to the first juncture 14, although the positioning of the handle 22 with respect to the juncture may vary according to case design and weight. The handle 22 may extend through any cosmetic panels of the exterior 11, particularly if they are formed of a plastic or relatively weak material, and may be connected directly to the chassis of the computer case.

The system 20 of the invention may further include a support 30 that provides support to the monitor 1 when the monitor is coupled to the computer case 10 for transport. The character of the support provided by the computer case 10 to the monitor 1 is primarily in the vertical direction, and also provides some resistance to movement (for example, by sliding) of the monitor 1 with respect to the exterior of the case during transport. The support 30 may thus be located on the exterior 11 of the computer case 10. The support 30 may be located on the first face 12 of the exterior 11, and may be spaced away from the first juncture 14. In some embodiments, the support 30 is located toward the first outboard edge 15, and may be located at the outboard edge 15.

The support 30 may comprise a support surface 34 that is formed on the computer case 10. The support surface 34 may be oriented such that it is substantially horizontal when the computer case is positioned for being transport. The support surface 34 may extend in a plane that is oriented substantially perpendicular to the first face 12, and may be oriented substantially parallel to the second face 13. In some embodiments, the support surface 34 may be located on a ledge 32 that extends outwardly or protrudes from the second face 13 of the computer case 10. The ledge 32 may have an outer edge 36, which may be oriented substantially parallel to a plane of the first face 12. Optionally, the outer edge 36 of the ledge 32 may have a portion that is slightly upturned to hook onto a void that is located on the bottom 6 of the monitor 1, such as may be formed by the molding of the base portion 5. While other, more specialized interlocking relationships between the base portion 5 of the monitor and the case 10 of the computer may be provided, it is believed that a substantially flat support surface 34 provides the most universal support for different monitor designs of different sizes and manufacturers. In other embodiments of the support 30, the support surface 34 may be located on an indentation or recess or even a slot formed on the computer case 10. The support surface 34 may thus extend into the first face 12 such that the support surface extends away from the first face 12 in toward the interior of the computer case.

The system 20 may also include a binder member 40 for removably binding the monitor 1 to the computer case 10 when the monitor is positioned on the support 30. The binder member 40 may thus apply force to the monitor 1 to bias it toward the case 10. In some embodiments, the binder member 40 is configured to extend about a portion of the case 10 and the monitor 1 resting on the support 30 to holder the monitor, and more specifically the display bezel 3 of the screen portion 4 of the monitor, against the first face 12 of the case 10. The front of the base portion 5 of the monitor may also be held in contact against the first face 12. The binder member 40 may comprise a relatively flexible strap that includes a means for attaching one end of the strap to a location on the strap, so that a loop of an adjustable size is formed, and is thus able to be tightened against the case and monitor to cause the monitor to be pressed against the first face 12 of the case 10. For example, a friction buckle 42 may be employed to join the portions of the binder member 40 together, or cooperative sections of hook and loop fasteners positioned on opposite portions of the binder member 40 may provide a sufficiently secure and adjustable connection.

Optionally, the binder member 40 may be inserted into or about various features or apertures of the screen portion 4 or base portion 5 of the monitor to further secure the monitor to the case, and the flexibility of the binder member facilitates this option. For example, the binder member 40 may be threaded between the screen portion 4 and the base portion 5, or may be extended along a crotch or crease formed where the screen portion joins to the base portion. It will be recognized by those skilled in the art that the binder member 40, while flexible, should be sufficiently resistant to stretching so that the pressure applied to the monitor by the member 40 does not vary appreciably when the unit is being carried. Optionally, the binder member 40 may be relatively less flexible, and substantially rigid, in character. The binder member 40 may also extend only along a portion of the computer case 10. For example, the binder member 40 may be attached directly to the exterior 11 of the computer case 10 at spaced locations on the case 10. This attachment may be illustratively accomplished by fastening ends of the binder member 40 to the case by, for example, fasteners extending through the binder member, or by looping portions of the binder member 40 through loops formed on the case. Those skilled in the art will recognize other manners of attaching the binder member 40 to the case 10 that are also suitable.

It will be recognized that the precise positioning of the handle 22 on the exterior 11 may be affected by the approximate center of gravity of the combined case and monitor combination, so that the computer case and monitor combination, when supported by the handle 22, is maintained in a substantially upright orientation.

It should be recognized that other components in addition to the monitor 1 may be carried with the computer case 10, such as, for example, a keyboard, external peripherals such as disk drives, and the like. These components may be bound to the computer case in a similar manner using the binder member. For example, a keyboard may be positioned on a side of the computer case 10 opposite of the side against which the monitor is positioned, and the binder member 40 extending about the computer case may also extend about the keyboard.

It should also be recognized that the face 12 of the computer case 10 may be varied in contour to facilitate the positioning of the monitor against the face. For example, the face 12 may include an indentation or recess that is configured to receive a portion of the display bezel 3 and screen portion 4 of the monitor 1 to help protect the display screen surface 2 during transport and also may help to hold the monitor in position during transport. The first face 12 may thus be contoured in a manner that generally or exactly corresponds to the size and shape of the monitor bezel 3 to permit a portion of the bezel to extend through the plane of the first face 12.

The foregoing is considered as illustrative only of the principles of the invention. Further, since numerous modifications and changes will readily occur to those skilled in the art in view of the disclosure of this application, it is not desired to limit the invention to the exact embodiments, implementations, and operations shown and described. Accordingly, all equivalent relationships to those illustrated in the drawings and described in the specification, including all suitable modifications, are intended to be encompassed by the present invention that fall within the scope of the invention.

I claim:

1. A system for facilitating transport of a computer and a monitor as a unit, comprising:
   a computer case having an exterior with a first face;
   a support located on the computer case for supporting the monitor on the computer case; and
   a binder for removably binding the monitor to the computer case when the monitor is positioned on the support;
   wherein the support comprises a ledge extending outwardly from the first face of the exterior of the computer case, the ledge having a support surface extending outwardly from the first face;
   wherein the support surface on the ledge is oriented substantially perpendicular to the first face of the exterior of the computer case; and
   wherein the support surface is configured such that a bottom of a base portion of the monitor is restable on the support surface when a bezel of a screen portion of the monitor is positioned against the first face.

2. The system of claim 1 wherein the the first face is a major face of the exterior of the computer case.

3. The system of claim 2 wherein the ledge is positioned adjacent to juncture of the first face and another face of the exterior of the computer case.

4. The system of claim 1 wherein the exterior of the computer case includes a second face, and wherein the computer case comprises a tower computer case, the first face comprises a side face and the second face comprises a top face.

5. The system of claim 1 wherein the binder comprises a flexible strap configured to bind the monitor to the computer case.

6. The system of claim 1 wherein the exterior of the computer case includes a second face positioned adjacent to the first face; and
   a handle located on the exterior of the computer case for being gripped by a hand of a user, the handle being positioned on the second face.

7. The system of claim 6 wherein the first face and the second face are oriented substantially perpendicular to each other.

8. The system of claim 6 wherein the first face is oriented in a substantially vertical plane and the second face is oriented in a substantially horizontal plane.

9. The system of claim 6 wherein the computer case comprises a tower computer case, the first face comprising a side face of the tower computer case and the second face comprising a top face of the tower computer case.

10. The system of claim 6 wherein the first face has a first outboard edge opposite of a juncture at which the first and second faces converge, and the support is located toward the first outboard edge of the first face.

11. The system of claim 6 wherein the handle is located toward a juncture at which the first and second faces converge.

12. The system of claim 6 wherein the first face comprises a relatively larger face of the exterior of the computer case and the second face comprises a relatively smaller face of the exterior.

13. A method of transporting a computer and a monitor as easily separable units, the method comprising:
    placing the monitor on a support surface of a support formed on an exterior of a computer case, the exterior including a first face, the support surface being oriented substantially perpendicular to the first face;
    positioning a bottom of a base portion of the monitor on the support surface;
    positioning a bezel of the monitor against the first face of the exterior of the computer case;
    binding the monitor to the computer case to hold the monitor on the support by forming a loop with a binder and extending the loop of the binder about the monitor and the computer case; and
    grasping a handle on the computer case and lifting the computer case by the handle to thereby lift the monitor bound to the computer case.

14. The method of claim 13 wherein placing includes positioning a display screen of the monitor towards a side of the computer case to help protect the display screen.

15. The method of claim 13 wherein binding includes tightening the loop formed by the binder to hold the monitor against one side of the computer case.

16. The system of claim 1 wherein the support surface of the support is configured so that a base portion of the monitor is restable on the support surface to provide support in a vertical direction to the monitor.

17. The system of claim 1 wherein the support is configured in a manner such that the support surface is oriented substantially horizontally when the computer case is rested on a substantially horizontal surface.

18. The system of claim 1 wherein the binder is configurable into a loop, an effective length of the binder forming the loop being adjustable to adjust a size of the loop to fit monitors of different sizes.

19. The system of claim 1 further including a monitor having a screen portion and a base portion configured to support the screen portion on a surface.

20. The system of claim 19 wherein the base portion of the monitor is configured to support the monitor free of the computer case.

21. The system of claim 1 wherein the support includes a support surface formed on an indentation formed in the exterior of the computer case.

22. The system of claim 1 wherein a recess is formed in a first face of the exterior of the computer case, the recess being configured to receive a portion of the bezel of the screen portion of the monitor.

23. A system comprising:
   a monitor having a base portion and a screen portion, the screen portion having a bezel;
   a computer case having an exterior with a first face, a support formed on and extending away from the exterior of the computer case, a support surface on the support being oriented substantially perpendicular to the first face of the exterior such that a bottom of the base portion of the monitor is removably restable on the support surface when the bezel of the screen portion is abutted against the first face; and
   a flexible binder configured to removably bind the monitor to the computer case when the monitor is rested on the support.

24. They system of claim 23 wherein the base portion of the monitor is configured to support the screen portion in a manner that is free of the computer case during use of the monitor when the monitor is not rested on the support surface.

* * * * *